United States Patent
Tanner et al.

(10) Patent No.: US 7,651,071 B1
(45) Date of Patent: Jan. 26, 2010

(54) VALVE ASSEMBLY HAVING A FLAT BEAM SPRING-ENERGIZED SEAL MECHANISM

(75) Inventors: Justin A. Tanner, Queen Creek, AZ (US); Albert Kang, Chandler, AZ (US); Dave Tornquist, Chandler, AZ (US); David P. Gentile, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 7 days.

(21) Appl. No.: 12/211,255

(22) Filed: Sep. 16, 2008

(51) Int. Cl.
*F16K 25/00* (2006.01)

(52) U.S. Cl. .................. 251/174; 251/177; 251/180; 251/337; 267/158

(58) Field of Classification Search ............ 251/305, 251/306, 307, 308, 337, 174, 176, 177, 192; 267/158, 160
See application file for complete search history.

(56) References Cited

U.S. PATENT DOCUMENTS

| | | | | |
|---|---|---|---|---|
| 3,400,906 A | * | 9/1968 | Stocklin | 251/214 |
| 3,586,290 A | * | 6/1971 | Null | 251/306 |
| 3,642,248 A | * | 2/1972 | Benware | 251/174 |
| 4,105,040 A | * | 8/1978 | Chester | 251/174 |
| 4,378,104 A | * | 3/1983 | Ben-Ur | 251/306 |
| 4,616,670 A | * | 10/1986 | Duffy et al. | 251/86 |
| 4,632,360 A | * | 12/1986 | DeSalve | 251/175 |
| 4,872,642 A | * | 10/1989 | Oshima | 251/174 |
| 4,899,984 A | * | 2/1990 | Strickler et al. | 251/306 |
| 5,046,527 A | * | 9/1991 | Tervo | 251/308 |
| 5,577,970 A | | 11/1996 | Smith | |
| 5,653,251 A | | 8/1997 | Handler | |
| 2007/0256748 A1 | | 11/2007 | Brahim | |
| 2008/0023079 A1 | | 1/2008 | Dickenscheid et al. | |

\* cited by examiner

*Primary Examiner*—John Bastianelli
(74) *Attorney, Agent, or Firm*—Ingrassia Fisher & Lorenz, P.C.

(57) ABSTRACT

A valve assembly is provided that includes a flowbody, a valve element movably disposed within the flowbody, and a flat beam spring-energized seal mechanism. The flat beam spring-energized seal mechanism includes a wiper seal carried by one of the flowbody and the valve element and movable between a retracted position and an extended position. The wiper seal includes a wave contour defining at least one seal wave. A flat beam spring is disposed in alignment with the at least one seal wave and configured to move the wiper seal toward the extended position when a force is exerted upon it by the at least one seal wave.

20 Claims, 3 Drawing Sheets

VALVE ASSEMBLY HAVING A FLAT BEAM SPRING-ENERGIZED SEAL MECHANISM

TECHNICAL FIELD

The present invention generally relates to a sealing valve assemblies and, more particularly, to a valve assembly employing a flat beam spring-energized seal mechanism.

BACKGROUND

Sealing valve assemblies are utilized to control the flow of pressurized fluids in many high pressure applications. For example, in an aircraft cabin pressure regulation system, a sealing flap valve assembly may be utilized to regulate the flow of pressurized air from the fuselage interior to the ambient environment outside of the aircraft. A representative sealing flap valve assembly includes a valve element that is hingedly mounted within a flowbody and movable between full-open position, a closed position, and various intermediate positions. A wiper seal (e.g., an elongated polymeric strip) is typically affixed to an outer peripheral edge of the valve element. As the valve element moves into the closed position, the wiper seal sweeps across an inner surface of the flowbody to form a seal that substantially prevents the leakage of pressurized fluid past the closed valve element.

In many high pressure applications, it is desirable to enhance the sealing characteristics of a sealing flap valve assembly by spring biasing the wiper seal away from the valve element and into sealing engagement with an inner surface of the flowbody (commonly referred to as "energizing" the wiper seal). In such a case, the wiper seal may be disposed within a slot provided in an outer peripheral portion of the valve element. The wiper seal may slide within this slot between a retracted position and an extended position. A spring, such as a wave spring or a resilient wire form, is further disposed within the slot and compressed between an inner surface of the valve element and the wiper seal. The spring biases the wiper seal away from the valve element and toward the extended position. When the valve element moves into a closed position, the wiper seal sealingly engages the inner surface of the flowbody, which forces the wiper seal toward the retracted position. This further compresses the spring within the slot and thus increases the bias force exerted on the wiper seal by the spring. As a result, the wiper seal forms an enhanced seal with the inner surface of the flowbody across a greater range of the valve element's rotational path.

Although enhancing sealing between the wiper seal and the inner surface of the flowbody, valve assemblies including spring-energized seal mechanisms of the type described above may exhibit with certain limitations. For example, such spring-energized seal mechanisms may be relatively difficult and costly to assemble. The reliability of such a spring-energized seal mechanism may be negatively impacted by high frictional characteristics and stresses, and limited spring life cycles. Furthermore, conventional spring-energized seal mechanisms may not permit the spring bias force exerted on the wiper seal to be adjusted during valve operation.

It should thus be appreciated from the above that it would be desirable to provide a sealing valve assembly, such as a sealing flap valve assembly, having an energized wiper seal that is relatively easy and inexpensive to produce. Preferably, such a sealing valve assembly would minimize frictional stresses and operate in a reliable manner. Furthermore, other desirable features and characteristics of the present invention will become apparent from the subsequent detailed description of the invention and the appended claims, taken in conjunction with the accompanying drawings and this background of the invention.

BRIEF SUMMARY

The present invention provides a valve assembly including a flat beam spring-energized seal mechanism. In one embodiment, and by way of example only, the valve assembly includes a flowbody; a valve element movably disposed within the flowbody; and a flat beam spring-energized seal mechanism including a wiper seal, at least one recess and at least one flat beam spring. The wiper seal is carried by one of the flowbody and the valve element and movable between a retracted position and an extended position, the wiper seal including a wave contour along at least a portion of a periphery and defining at least one seal wave. The at least one recess is in cooperative alignment with the at least one seal wave. The at least one flat beam spring is disposed between the at least one seal wave and the at least one recess, the at least one flat beam spring configured to urge the wiper seal toward the extended position at least when a force is exerted upon the at least one flat beam spring by the at least one seal wave, the at least one recess configured to receive the at least one flat beam spring at least when the at least one flat beam spring is deflected into the at least one recess by the force exerted upon it by the at least one seal wave.

In another particular embodiment, and by way of example only, the valve assembly includes a flowbody; a valve element movably disposed within the flowbody; and a flat beam spring-energized seal mechanism including a wiper seal slidably coupled to the valve element and movable between a retracted position and an extended position, the wiper seal including a wave contour formed about at least a portion of a periphery of the wiper seal and defining at least one seal wave. The seal mechanism further including at least one recess in cooperative alignment with the at least one seal wave and at least one flat beam spring disposed between the at least one seal wave and the at least one recess, the at least one flat beam spring configured to urge the wiper seal toward the extended position at least when a force is exerted upon the at least one flat beam spring by the at least one seal wave, the at least one recess configured to receive the at least one flat beam spring at least when the at least one flat beam spring is deflected into the at least one recess by the force exerted upon it by the at least one seal wave.

In yet another particular embodiment, and by way of example only, the valve assembly includes a flowbody; a valve element movably disposed within the flowbody; and a flat beam spring-energized seal mechanism, comprising: an elongated wiper seal slidably coupled to the valve element and movable between a retracted position and an extended position, the elongated wiper seal including a wave contour formed in at least a portion of an edge surface and along a longitudinal axis thereof and defining a plurality of seal waves; a plurality of recesses formed in the valve element and in cooperative alignment with the plurality of seal waves; a flat beam spring disposed between the plurality of seal waves and the plurality of recesses, the flat beam spring configured to urge the elongated wiper seal toward the extended position at least when a force is exerted upon the flat beam spring by the plurality of seal waves, the plurality of recesses configured to receive the flat beam spring at least when the flat beam spring is deflected into the plurality of recesses by the force exerted upon it by the plurality of seal waves.

Other independent features and advantages of the preferred valve assembly including a flat beam spring-energized seal mechanism will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

The embodiment disclosed herein is described in sufficient detail to enable those skilled in the art to practice the invention, and it is to be understood that other embodiments may be utilized and that logical mechanical changes may be made without departing from the scope of the present invention. Furthermore, it will be understood by one of skill in the art that although the specific embodiment illustrated below is directed at valve assemblies typically found in an aircraft, for purposes of explanation, the assembly may be used in various other embodiments employing various types of components that require valve assemblies. The following detailed description is, therefore, not to be taken in a limiting sense.

Figure 1:
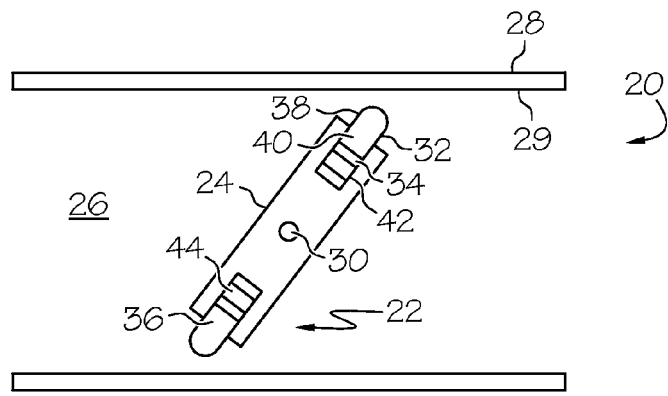
FIG. 1 is a simplified cross-sectional view of a valve assembly including a flat beam spring-energized seal mechanisms in non-sealing or extended position according to an exemplary embodiment.
Figure 2:
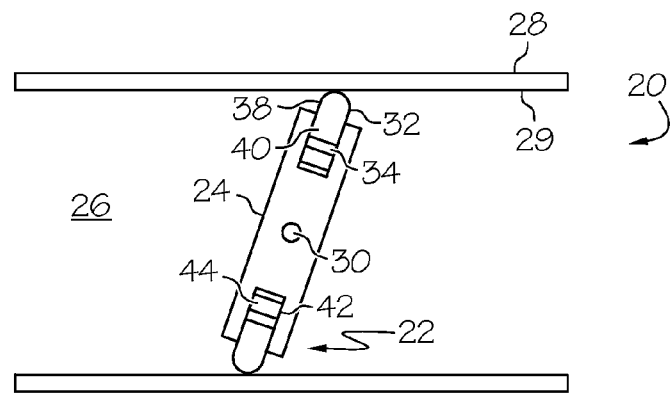
FIG. 2 is a simplified cross-sectional view of the valve assembly of FIG. 1 illustrated in a first sealing or intermediate position.
Figure 3:
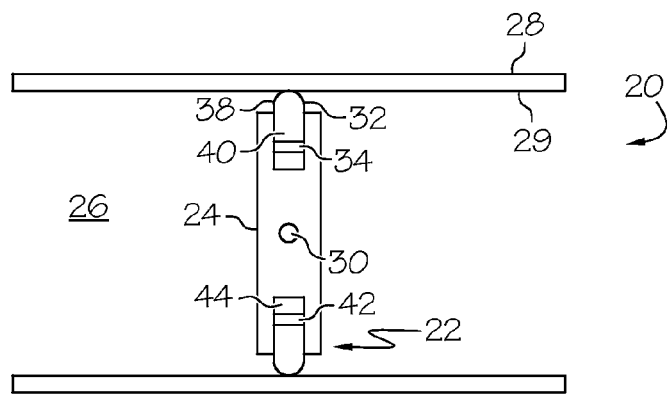
FIG. 3 is a simplified cross-sectional view of the valve assembly of FIG. 1 illustrated in a second sealing or retracted position.

FIGS. 1, 2, and 3 are simplified cross-sectional views of a valve assembly 20 having a flat beam spring-energized seal mechanism 22 in accordance with a first exemplary embodiment. The valve assembly 20 includes a valve element 24 that is movably disposed within a main flow passage 26 provided through a flowbody 28. In the illustrated exemplary embodiment, the valve element 24 assumes the form of a butterfly plate and is rotatably mounted within the flow passage 26 as indicated in FIGS. 1-3 at 30. In this case, the valve element 24 may be substantially rectangular in shape and have the flat beam spring-energized seal mechanism 22 mounted about a periphery. This example notwithstanding, the valve element 26 may assume various other forms, as well, e.g., a flap door hingedly mounted within flowbody 28. The valve element 24 is movable amongst a full-open position (FIG. 1), a closed position (FIG. 3), and various intermediate positions (FIG. 2). During operation of the valve assembly 20, the valve element 24 may be moved amongst these positions by a non-illustrated valve actuator to regulate the flow of pressurized fluid through the flowbody 28. Alternatively, the valve element 24 may be biased toward the closed position (FIG. 3) by a non-illustrated torsion spring.

In the exemplary embodiment shown in FIGS. 1-3, the flat beam spring-energized seal mechanism 22 is incorporated into the valve element 24 and comprises three main components: (i) a movable wiper seal 32 including a plurality of seal waves defined therein; (ii) a flat beam spring 34; and (iii) a plurality of recesses formed in the valve element and in cooperating alignment with the plurality of seal waves. Each wiper seal 32 includes a first end portion 38 and a second end portion 40. The first end portion 38 sealing engages an inner surface 29 of the flowbody 28 when the valve element 24 is in the closed position (FIG. 3) and in certain intermediate positions (FIG. 2). The second end portion 40 is disposed substantially opposite the first end portion 38. As the valve element 24 rotates from an open position (FIG. 1) to the closed position (FIG. 3), the wiper seal 32 sweeps across the inner surface 29 of the flowbody 28. To facilitate this sweeping motion, the first end portion 38 of the wiper seal 32 may have a generally rounded cross-sectional shape. In addition, the first end portion 38, and perhaps the entire body of the wiper seal 32, may be formed from a flexible polymeric material, such as ultra high molecular weight polyethylene (UHMWPE), polyoxymethylene (Delrin®), polytetrafluoroethylene (Teflon®), and the like.

The wiper seal 32 is slidably coupled to the valve element 24. In particular, the second end portion 40 of the wiper seal 32 is received by a longitudinal cavity or slot 42 provided within an outer peripheral portion of valve element 24. The wiper seal 32 may move within the longitudinal slot 42 amongst an extended position (FIG. 1), a retracted position (FIG. 3), and various intermediate positions (FIG. 2). As described below, the flat beam spring 34, in cooperation with the plurality of seal waves (described presently), biases the wiper seal 32 towards the extended position shown in FIG. 1 and against the inner surface 29 of the flow body 28 when the valve element 24 is in the closed position shown in FIG. 3.

In the exemplary embodiment illustrated in FIGS. 1-3, the flat beam spring 34 is disposed within or mounted to the frame of valve element 24 within the longitudinal slot 42. In certain embodiments, the flat beam spring 34 may comprise one or more spring elements; however, in a preferred embodiment a single flat beam spring 34 is used. The particular shape, thickness, and material selected for the flat beam spring 34 may vary amongst different embodiments. As a non-limiting example, the flat beam spring 34 may be comprised of a corrosion resistant steel, such as a stainless steel.

A plurality of seal waves 36, of which only one is illustrated, are defined in the end portion 40 of the wiper seal 32. More particularly, a wave contour, comprised of a plurality of peaks and valleys, is machined into the end portion 40 of the wiper seal 32 and about a periphery thereof. A plurality of cooperating recesses 44 are formed in the valve element 24 in alignment with the longitudinal slot 42 and with each peak of the plurality of seal waves 36. The flat beam spring 34 is disposed within the longitudinal slot, between the plurality of seal waves 36 and the plurality of cooperating recesses 44.

As the valve element 24 is rotated to an open position, the flat beam spring 34 biases the wiper seal 32 away from valve element 24 and toward the extended position shown in FIG. 1. The flat beam spring 34 consequently biases the wiper seal 32 into sealing engagement with the inner surface 29 of the flowbody 28 when the valve element 24 is rotated to the closed position (FIG. 3) and certain intermediate positions (FIG. 2) to substantially prevent fluid leakage past the valve element 24. Notably, as the valve element 24 rotates into the closed position (FIG. 3), the wiper seal 32 contacts the inner surface 29 of the flowbody 28, which forces the wiper seal 32 to move toward its retracted position (FIG. 3). This results in the seal waves 36 of the wiper seal 32 exerting an increased force upon the flat beam spring 34. The force by the plurality of seal waves 36 deflects the flat beam spring 34 into the plurality of cooperating recesses 44 formed in the valve element 24 and biases the wiper seal 32 away from the valve element 24. Thus, as the valve element 24 rotates into a closed position, the seal waves 36, the cooperating recesses 44 formed in the valve element 24, and the flat beam spring 34 force the wiper seal 32 into sealing engagement with the inner surface 29 of the flowbody 28 in which the valve element 24 is mounted.

Thus, in contrast to conventional bent wave spring-energized seal mechanisms, the flat beam spring-energized seal mechanism 22 provides a bias force as the valve element 24 rotates into the closed position without the generation of high stresses typically found in bent wave springs. In addition, the flat beam spring-energized seal mechanism 22 does not include the cumbersome bent wave features found in conventional bent wave spring mechanisms and is thus relatively easy and inexpensive to manufacture.

Figure 4:
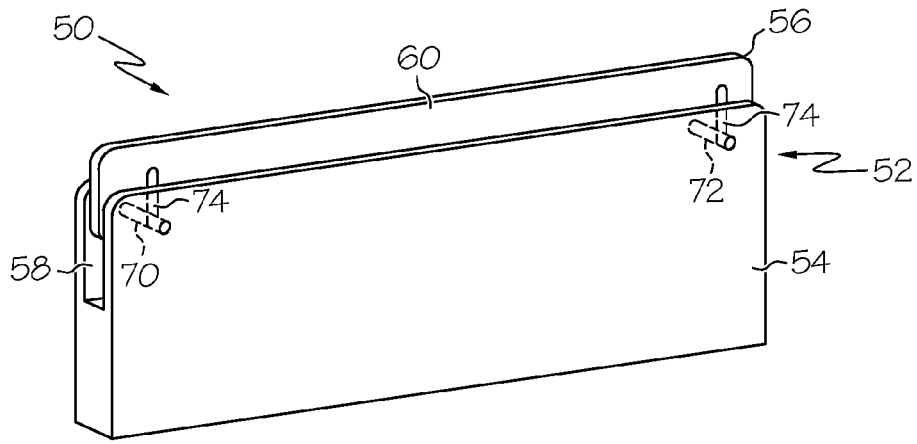
FIG. 4 is an isometric view of a flat beam spring-energized seal mechanism according to an exemplary embodiment.
Figure 5:
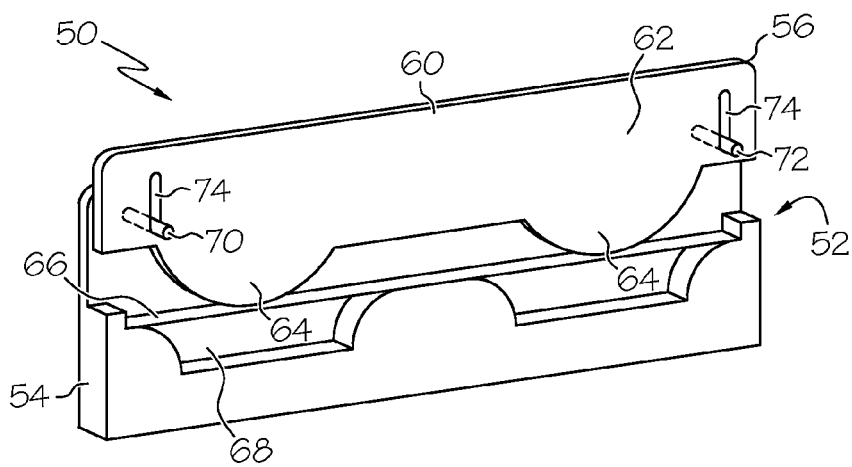
FIG. 5 is a cross-sectional isometric view of the flat beam spring-energized seal mechanism of FIG. 4 illustrated in a non-sealing or extended position.
Figure 6:
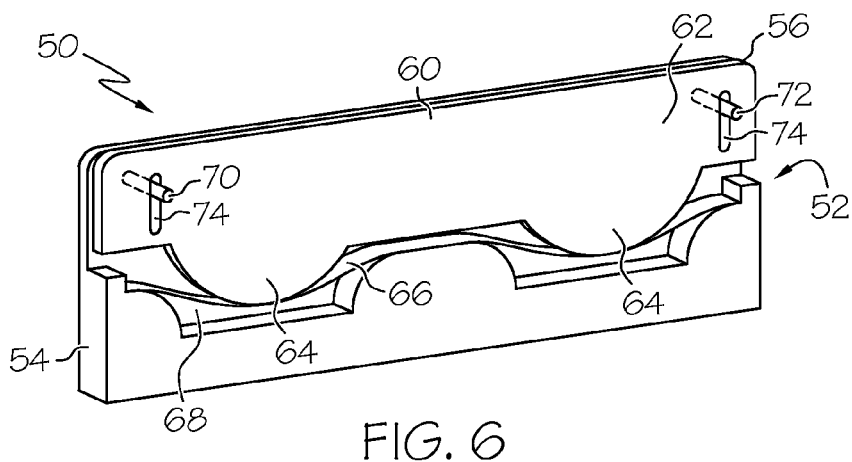
FIG. 6 is a cross-sectional isometric view of the flat beam spring-energized seal mechanism of FIG. 4 illustrated in a sealing or retracted position.

FIGS. 4-6 are isometric views of a portion of a valve assembly 50 including a flat beam spring-energized seal mechanism 52 slidably mounted within a valve element 54 (e.g., a flapper, a door, a plate, etc.) in accordance with a second exemplary embodiment. For clarity, only a portion of valve element is shown in FIGS. 4-6, and the flowbody in which valve element 54 is movably mounted is not shown. In many respects, the flat beam spring-energized seal mechanism 52 is similar to flat beam spring-energized seal mechanism 22 discussed above in conjunction with FIGS. 1-3. For example, the flat beam spring-energized seal mechanism 52 includes an elongated wiper seal 56 that is slidably disposed within a longitudinal slot 58 (labeled in FIG. 4) provided in an outer peripheral portion of the valve element 54. The elongated wiper seal 56 includes a sealing end portion 60, which may have a substantially rounded edge, and an opposing end portion 62. As was the case previously, the opposing end portion 62 has formed therein a plurality of seal waves 64. The plurality of seal waves 64 are formed by machining a wave contour in an edge surface of the end portion 62 and along a longitudinal axis of the elongated wiper seal 56. The wave contour defining a plurality of peaks and valleys that form the plurality of seal waves 64.

The valve element 54 further includes a flat beam spring 66 and a plurality of recesses 68 formed in the valve element 54 and in cooperative alignment with each of the plurality of seal waves 64. As was the case previously, the elongated wiper seal 56 is movable amongst an extended position (FIG. 5), a retracted position (FIG. 6), and a plurality of intermediate positions. Optional first and second guide members 70 and 72 are fixedly coupled to the valve element 54. In this example, the guide members 70 and 72 each assume the form of a post that extends through a corresponding slot 74 provided through the elongated wiper seal 56. This example notwithstanding, it will be appreciated that the guide members 70 and 72 may assume any form suitable for guiding the movement of the elongated wiper seal 56 and/or retaining the end portion 62 of the elongated wiper seal 56 within the slot 58.

In the exemplary embodiment shown in FIGS. 4-6, the plurality of seal waves 64, of which two are illustrated, are formed into the end portion 62 of the wiper seal 56. In the depicted embodiment the plurality of seal waves 64 are formed to have a generally sinusoidal wave shape, and are laterally spaced along the length of the end portion 62 of the elongated wiper seal 56. This is merely exemplary, and the seal waves 64 may be formed to have any suitable particular shape provided that they are able to deflect the flat beam spring 66 into the recesses 68. In the example shown in FIGS. 5 and 6, the flat beam spring 66 is formed of a corrosion resistant metal, such as a stainless steel. Due to the force exerted on the flat beam spring 66 by the plurality of seal waves 64, the elongated wiper seal 56 is biased away from valve element 54 and toward the extended position (FIG. 4). Thus, as valve element 54 rotates into a closed position, the plurality of seal waves 64 exert an increased force upon the flat beam spring 66, deflecting it into the recesses 68 and forcing the elongated wiper seal 56 into sealing engagement with the inner surface of the flowbody in which valve element 54 is mounted (e.g., inner surface 29 of flowbody 28 shown in FIGS. 1-3).

Figure 7:
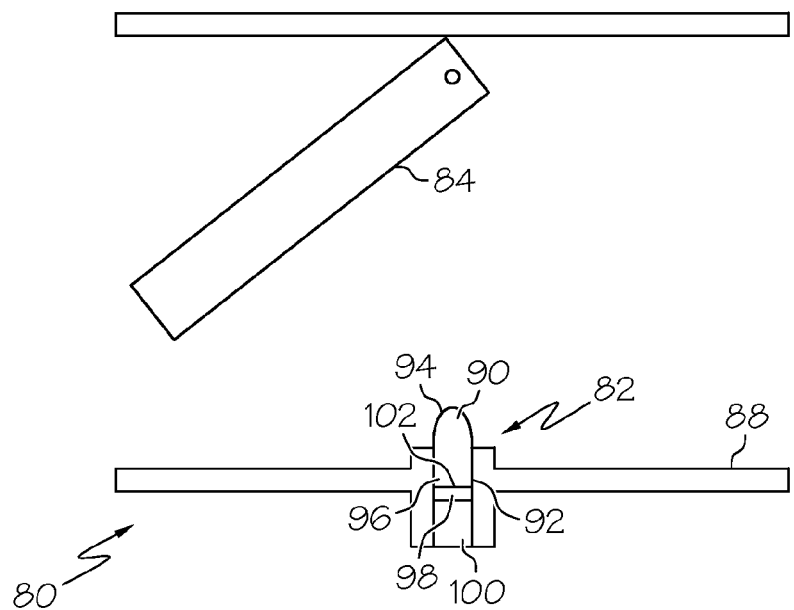
FIG. 7 is an isometric cross-sectional view of a valve assembly including a flat beam spring-energized seal mechanism in a non-sealing or extended position according to an exemplary embodiment.
Figure 8:
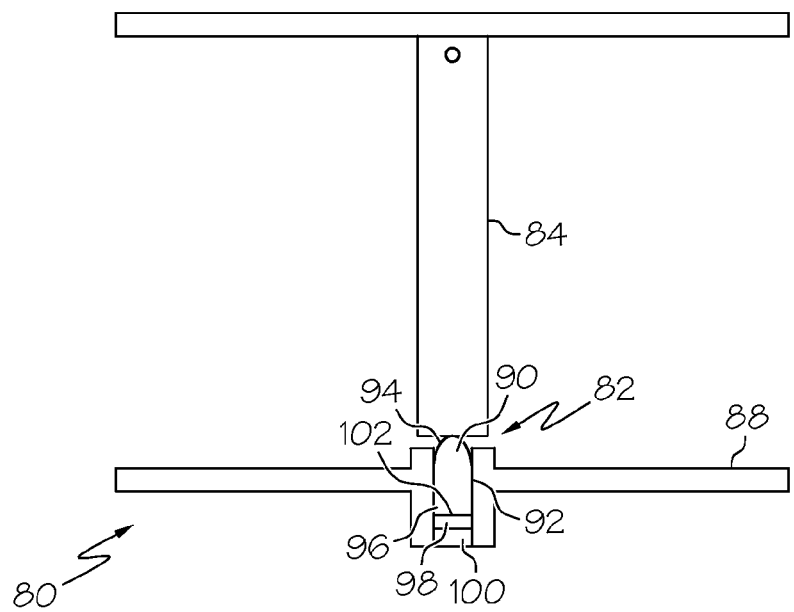
FIG. 8 is an isometric cross-sectional view of the valve assembly of FIG. 7 illustrated in a sealing or retracted position.

FIGS. 7 and 8 are simplified cross-sectional views of a valve assembly 80 having a flat beam spring-energized seal mechanism 82 in non-sealing and sealing positions, respectively, in accordance with a third exemplary embodiment. Valve assembly 80 is similar to valve assembly 20 described above in conjunction with FIGS. 1-3; e.g., valve assembly 80 includes a valve element 84 (e.g., a flap door) that is hingedly mounted within a main flow passage 86 provided through a flowbody 88. However, in contrast to the valve assembly 20, the seal mechanism 82 is not integrated into the valve element 84 but is instead integrated into the flowbody 88. In this example, the seal mechanism 82 comprises a wiper seal 90 that is movably disposed within a cavity 92 provided within a wall of the flowbody 88. The wiper seal 90 includes a sealing end portion 94, which may have a substantially rounded edge to facilitate contact with the peripheral edge of the valve element 84 as the valve element 84 swings closed, and an opposing end portion 96. The wiper seal 90 is movable between an extended position (FIG. 7), a retracted position (FIG. 8), and various intermediate positions. A flat beam spring 98 is disposed within the cavity 92. At least one seal wave 102 is formed into the end portion 96 of the wiper seal 90 and substantially in aligned cooperation with a recess 100 formed at a proximate end of the cavity 92. The flat beam spring 98 biases the wiper seal 90 into the flow passage 86 and toward the extended position (FIG. 7). When the valve element 84 rotates into the closed position (FIG. 8), the at least one seal wave 102, the flat beam spring 98 and the recess 100 cooperate to bias the wiper seal 90 into sealing engagement with the peripheral edge of valve element 84. As a result of this bias force, the wiper seal 90 forms a more complete seal with valve element 84 in the closed position shown in FIG. 8 and, perhaps, in other near closed positions. It should thus be appreciated that valve assembly 80 differs from the valve assembly 20 (FIGS. 1-3) in that flat beam spring-energized seal mechanism 82 is integrated into flowbody 88 as opposed to being integrated into the valve element 84.

It should be appreciated that there has been provided various embodiments of a valve assembly including a flat beam spring-energized seal mechanism that minimizes stresses commonly associated with bent wave spring-energized mechanisms, that operates in a reliable manner, and that is relatively easy and inexpensive to produce. It should be noted that the wiper seal may assume a curved or arcuate shape in embodiments wherein the inner surface of the flowbody and/or the peripheral edge of the valve element is curved (e.g., when the valve element assumes the form of a butterfly plate having a generally circular or oval circumferential shape).

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

What is claimed is:

1. A valve assembly, comprising:
   a flowbody;
   a valve element movably disposed within the flowbody; and
   a flat beam spring-energized seal mechanism, comprising:
      a wiper seal carried by one of the flowbody and the valve element and movable between a retracted position and an extended position, the wiper seal including a wave contour along at least a portion of a periphery and defining at least one seal wave;
      at least one recess in cooperative alignment with the at least one seal wave;
      at least one flat beam spring disposed between the at least one seal wave and the at least one recess, the at least one flat beam spring configured to urge the wiper seal toward the extended position at least when a force is exerted upon the at least one flat beam spring by the at least one seal wave, the at least one recess configured to receive the at least one flat beam spring at least when the at least one flat beam spring is deflected into the at least one recess by the force exerted upon it by the at least one seal wave.

2. A valve assembly as claimed in claim 1, wherein the flat beam spring-energized seal mechanism is integrated into the valve element.

3. A valve assembly as claimed in claim 2, wherein the valve element comprises a longitudinal slot, and wherein the wiper seal comprises:
   a first end portion configured to sealingly engage an inner surface of the flowbody; and
   a second end portion disposed substantially opposite the first end portion and slidably received within the longitudinal slot.

4. A valve assembly as claimed in claim 3, wherein the first end portion is generally rounded.

5. A valve assembly as claimed in claim 4, wherein the at least one flat beam spring is disposed within the valve element proximate the longitudinal slot and in cooperative alignment with the at least one recess and the at least one seal wave.

6. A valve assembly as claimed in claim 3, further comprising a guide member fixedly coupled to the valve element and configured to guide the movement of the wiper seal within the longitudinal slot.

7. A valve assembly as claimed in claim 1, wherein the flat beam spring-energized seal mechanism is integrated into the flowbody.

8. A valve assembly as claimed in claim 7, wherein the wiper seal comprises:
   a first end portion configured to sealingly engage with the valve element; and
   a second end portion substantially opposite the first end portion and slidably received within the flowbody.

9. A valve assembly as claimed in claim 8, wherein the first end portion is generally rounded.

10. A valve assembly as claimed in claim 1, wherein the wave contour defines a plurality of seal waves spaced about a periphery of the wiper seal.

11. A valve assembly, comprising:
    a flowbody;
    a valve element movably disposed within the flowbody; and
    a flat beam spring-energized seal mechanism, comprising:
       a wiper seal slidably coupled to the valve element and movable between a retracted position and an extended position, the wiper seal including a wave contour formed about at least a portion of a periphery of the wiper seal and defining at least one seal wave;
       at least one recess in cooperative alignment with the at least one seal wave; and
       at least one flat beam spring disposed between the at least one seal wave and the at least one recess, the at least one flat beam spring configured to urge the wiper seal toward the extended position at least when a force is exerted upon the at least one flat beam spring by the at least one seal wave, the at least one recess configured to receive the at least one flat beam spring at least when the at least one flat beam spring is deflected into the at least one recess by the force exerted upon it by the at least one seal wave.

12. A valve assembly as claimed in claim 11, wherein the wave contour defines a plurality of seal waves laterally spaced about at least a portion of the periphery of the wiper seal.

13. A valve assembly as claimed in claim 12, further including a plurality of cooperative recesses formed in the valve element each in cooperative alignment with one of the plurality of seal waves.

14. A valve assembly as claimed in claim 11, wherein the valve element comprises a door hingedly mounted within the flowbody and including a longitudinal slot formed in an outer peripheral portion thereof, wherein the wiper seal further comprises:
    a rounded first end portion configured to sealingly engage an inner surface of the flowbody; and
    a second end portion disposed substantially opposite the first end portion and slidably received within the longitudinal slot.

15. A valve assembly as claimed in claim 14, wherein the at least one flat beam spring is disposed within the valve element proximate the longitudinal slot and in cooperative alignment with the at least one recess and the at least one seal wave.

16. A valve assembly as claimed in claim 11, wherein the at least one flat beam spring is formed of a corrosion resistant metal.

17. A valve assembly as claimed in claim 16, wherein the corrosion resistant metal is stainless steel.

18. A valve assembly as claimed in claim 11, wherein the valve assembly is a butterfly valve assembly.

19. A valve assembly, comprising:
    a flowbody;
    a valve element movably disposed within the flowbody; and a flat beam spring-energized seal mechanism, comprising:

an elongated wiper seal slidably coupled to the valve element and movable between a retracted position and an extended position, the elongated wiper seal including a wave contour formed in at least a portion of an edge surface and along a longitudinal axis thereof and defining a plurality of seal waves;

a plurality of recesses formed in the valve element and in cooperative alignment with the plurality of seal waves;

a flat beam spring disposed between the plurality of seal waves and the plurality of recesses, the flat beam spring configured to urge the elongated wiper seal toward the extended position at least when a force is exerted upon the flat beam spring by the plurality of seal waves, the plurality of recesses configured to receive the flat beam spring at least when the flat beam spring is deflected into the plurality of recesses by the force exerted upon it by the plurality of seal waves.

20. A valve assembly as claimed in claim 19, wherein the valve element comprises a flap door hingedly mounted within the flowbody and including a longitudinal slot formed in an outer peripheral portion thereof, wherein the elongated wiper seal further comprises:

a rounded first end portion configured to sealingly engage an inner surface of the flowbody; and a second end portion disposed substantially opposite the first end portion and slidably received within the longitudinal slot.

* * * * *